United States Patent
Wilson (10) Patent No.: US 11,294,261 B2
(45) Date of Patent: Apr. 5, 2022

(54) LENS CAP-CASE

(71) Applicant: Jeffrey Overall, Costa Mesa, CA (US)

(72) Inventor: Tyler Wilson, Huntington Beach, CA (US)

(73) Assignee: Polar Pro Filters, Inc., Costa Mesa, CA (US)

( * ) Notice: Subject to any disclaimer, the term of this patent is extended or adjusted under 35 U.S.C. 154(b) by 0 days.

(21) Appl. No.: 17/200,390

(22) Filed: Mar. 12, 2021

(65) Prior Publication Data

US 2021/0232019 A1    Jul. 29, 2021

(51) Int. Cl.
*G03B 11/04* (2021.01)
*G03B 17/12* (2021.01)

(52) U.S. Cl.
CPC ............ *G03B 11/043* (2013.01); *G03B 17/12* (2013.01)

(58) Field of Classification Search
CPC ..... G03B 11/043; G03B 17/043; G03B 17/12
See application file for complete search history.

(56) References Cited

U.S. PATENT DOCUMENTS

| | | | |
|---|---|---|---|
| 4,172,485 A | 10/1979 | Mathieu | |
| 4,909,617 A | 3/1990 | Boyd | |
| 5,095,327 A | 3/1992 | Boland | |
| 7,502,550 B2 | 3/2009 | Ariga | |
| 7,721,480 B2 | 5/2010 | Campean | |
| 7,843,504 B2 | 11/2010 | Lee | |
| 8,229,295 B2 | 7/2012 | Wu | |
| 8,740,480 B2 | 6/2014 | Garber | |
| 9,525,809 B2 | 12/2016 | Kondou | |
| 10,042,139 B2 | 8/2018 | Ho | |
| 10,725,264 B2 | 7/2020 | Takama | |
| 2012/0281977 A1 | 11/2012 | Stevenson | |
| 2013/0177304 A1 | 7/2013 | Chapman | |

OTHER PUBLICATIONS

Williamcr Store "Williamcr Lens Protective Cap Cover+37mm UV Filter Lens for XIAOMi Yi 2 II 4K 4K+ Action Camera Accessories", https://www.amazon.com/Williamcr-Xiaomi-Action-Protective-Accessories/dp/B073TXWM8P (Year: 2018).*
JJC Store "2 Pack JJC E-Mount Body Cap and Rear Lens Cap Kit for Sony A6000 A6100 A6300 A6400 A6500 A6600 A5100 ZV-E10 A1 A7C A7 IV III II A7R IV III II A7S III II A9 NEX-6 and More Sony Mirrorless Camera & Lens", https://www.amazon.com/2-Pack-JJC-Mount-mount-Mirrorless/dp/B06XPGY5TF(Year: 2017).*
Desmond-ICE "ICE 86mm Filter Stack Cap Set Metal Front & Rear Lens Caps 86", https://www.amazon.com/86mm-Filter-Stack-Metal-Front/dp/B08CMV44YS (Year: 2019).*
Neewer Store "Neewer Camera Lens Filter Kit compatible with gopro Hero 5/6/7: (4)Neutral Density ND Filter(ND4/ND8/ND16/ND32), (1)UV Filter, (1)CPL Filter, (2)Lens Cap, (2)Lens Adapter Ring", https://www.amazon.com/Neewer-Camera-Lens-Filter-GoPro/dp/B074V76DWB (Year: 2017).*
Urth Store "Urth 52mm Lens Filter Caps", https://www.amazon.com/Urth-Gobe-52mm-Lens-Filter/dp/B088C3GZ58 (Year: 2020).*

\* cited by examiner

*Primary Examiner* — Clayton E. LaBalle
*Assistant Examiner* — Diana Hancock (57) ABSTRACT

A protective lens cap capable of alternatively functioning as a storage case for a camera accessory.

5 Claims, 10 Drawing Sheets

LENS CAP-CASE

RELATED APPLICATIONS

This application claims priority to provisional application Ser. No. 63/069,430, filed on Aug. 24, 2020, by the present inventor, which is incorporated by reference in its entirety.

FIELD OF INVENTION

The present invention relates to optical device storage and protection. Specifically, it relates to a lens cap capable of functioning alternatively or simultaneously as a storage case and protective lens cap.

BACKGROUND

Photographers and filmographers use filters, lenses, and other camera accessories to improve the quality of captured content. These accessories include glass and other fragile components. Protective cases exist for the transportation of the accessories when uncoupled from a camera. Lens caps exist for protection of filters and lenses that are coupled with a camera. The present invention alternatively functions as a protective case and a lens cap.

SUMMARY

A case is configured to house an optical element within a cavity. Sidewalls extend from the perimeter of a protective base to form the cavity. There are plate coupling means on the outer surface of the base.

A plate is configured to couple with both the plate coupling means and a camera accessory, i.e. optical element. An access position is created when the plate is coupled with the plate coupling means of the base. In the access position the cavity is exposed, enabling installation and removal of an optical element. A housed optical element, such as a camera filter, may be coupled with a camera, whereby the lens-cap case functions as a lens cap.

The plate also comprises filter coupling means. The filter coupling means enable the plate to couple with an optical element. A storage position is created when the plate couples with a housed optical element. In a storage position the optical element is completely encased, and the lens-cap case functions as a protective case.

DRAWING NUMERALS

10 Plate
11 Plate Top
12 Plate Coupling Component
14 Ring
16 Male Bayonet
18 Plate Threading
19 Inner Planar Surface of the Plate
20 Case
30 Base
32 Substrate Flange
33 Dampening Layer
34 Female Bayonet
36 Outer planar surface
37 Inner planar surface
40 Sidewall
41 Sidewall Back Perimeter
42 Base Overmold
50 Filter
52 Cavity
54 Filter Threading
60 Access Position
62 Storage Position

DETAILED DESCRIPTION OF THE DRAWINGS

A plate 10 and case 20 comprise the modular components of a lens cap-case. The case 20 may be cylindrical or frustoconical, with a curved sidewall 40 extending between a closed front end and an open back end. A base 30 may comprise the closed front end. The sidewall 40 couples with and extends from the base 30, and terminates at a sidewall back perimeter 41.

The base 30 may be comprised of glass filled nylon, aluminum, brass, acrylonitrile butadiene styrene, polylactic acid or material with similar Shore durometer hardness rating. The base 30 may be disc shaped with an outer planar surface 36 and an inner planar surface 37. Plate coupling means may extend from the outer planar surface 36. A female bayonet 34 aspect of a bayonet coupling system comprises exemplary plate coupling means The sidewall 40 may extend from the outer perimeter of the base 30. The sidewall 40 may be comprised of the same, contiguous material as the base 30, or distinct material. Thermoplastic polyurethanes or other thermoplastic elastomer material may comprise the sidewall 40. The sidewall 40 may be conjoined with the base 30 by an injection molding process, such as overmolding. The base 30 may serve as a substrate to which the sidewall 40 is overmolded. The base 30 and sidewall 40 may form a cavity 52 configured to house a camera filter 50, or other optical element. A sidewall 40 comprised of thermoplastic polyurethane or other material with similar tolerancing may improve the ease by which a camera filter 50, or other optical element can be inserted into, and secured within, and removed from the cavity 52.

Figure 3A:
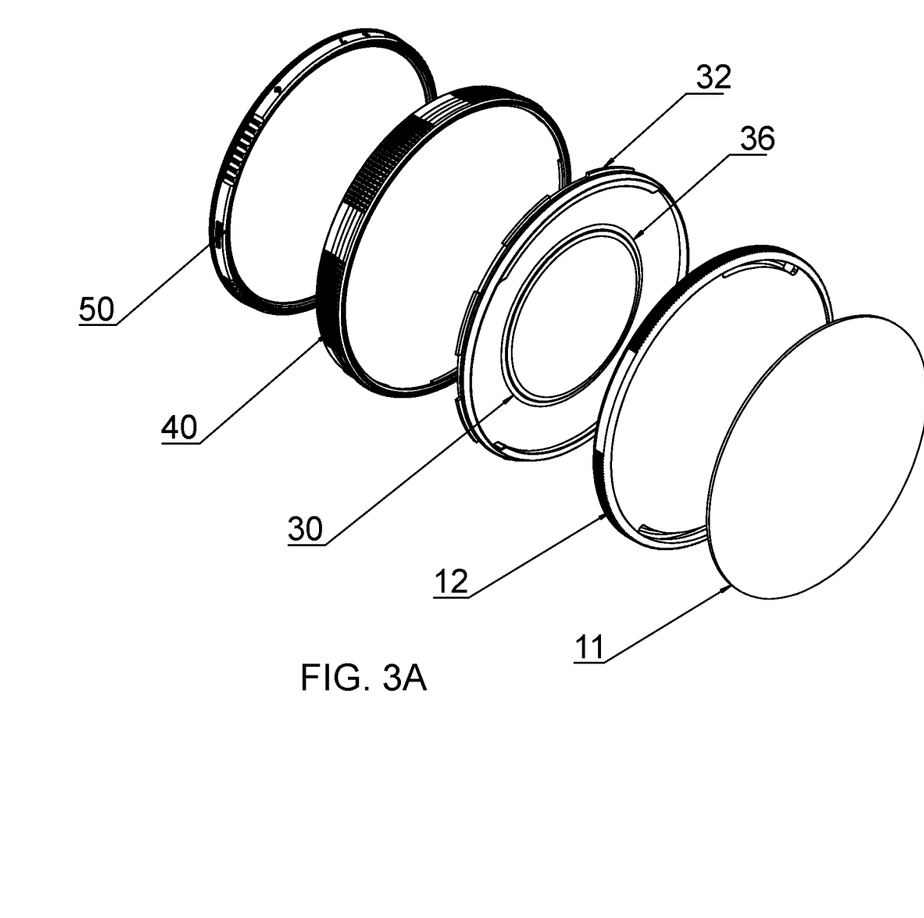
FIG. 3A is a perspective view of a lens cap exploded from an access position, and a camera filter.
Figure 3B:
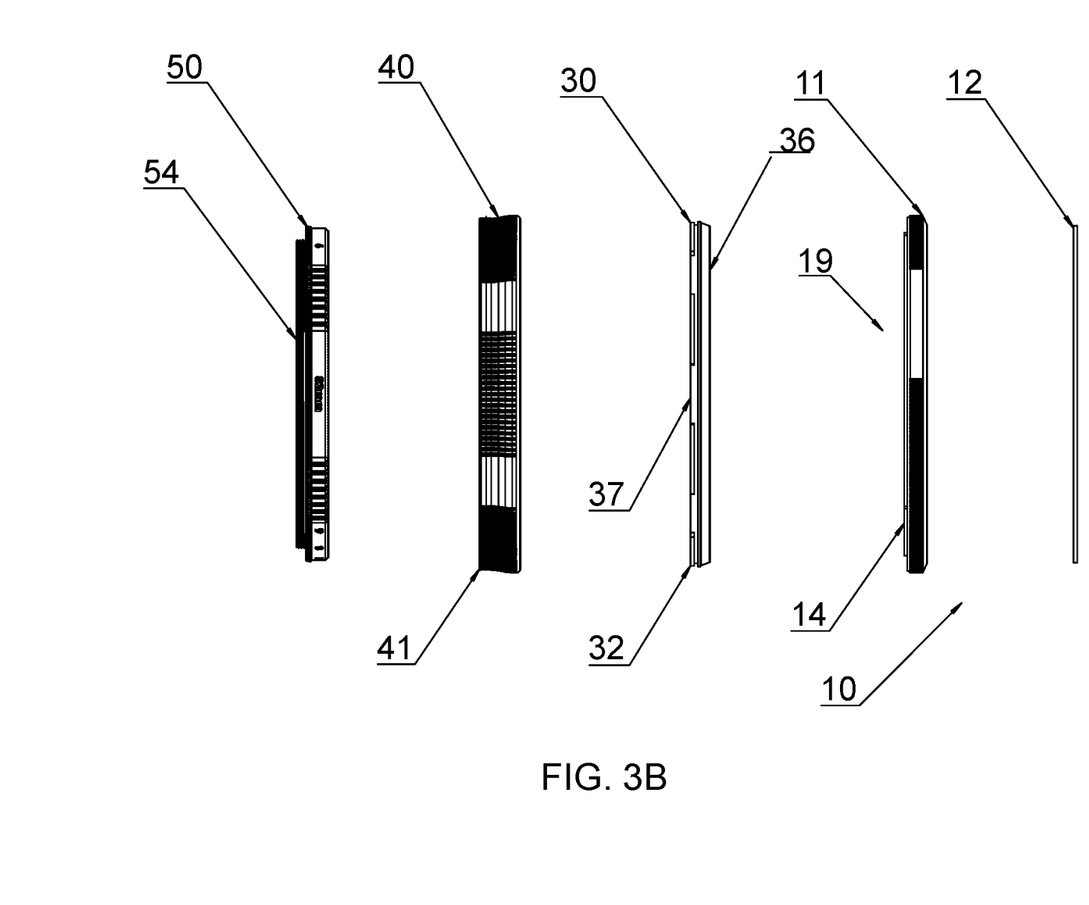
FIG. 3B is a right-side view lens cap exploded from an access position, and a camera filter
Figure 4A:
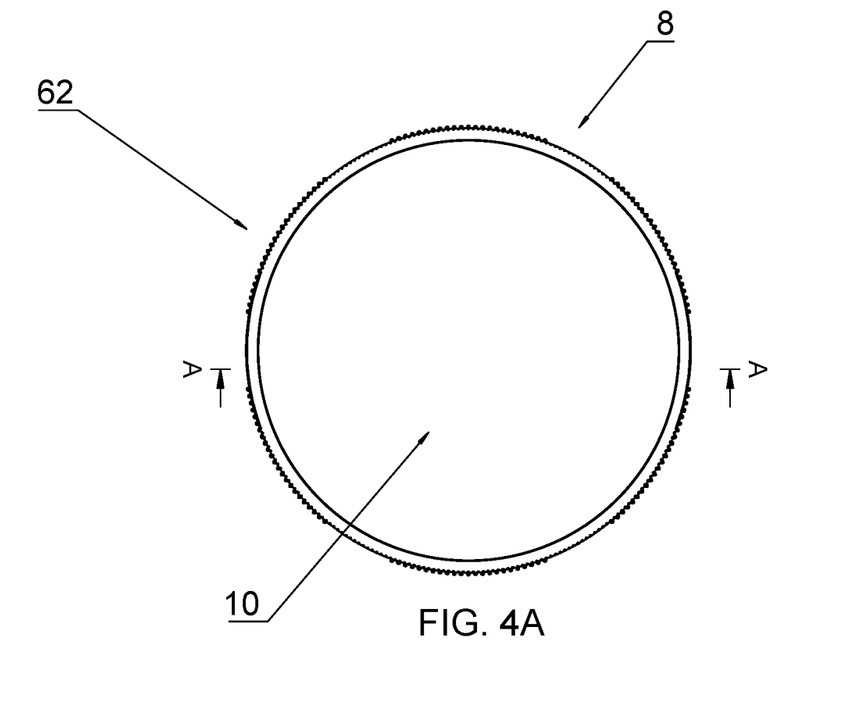
FIG. 4A is a front view of a lens cap.
Figure 4B:
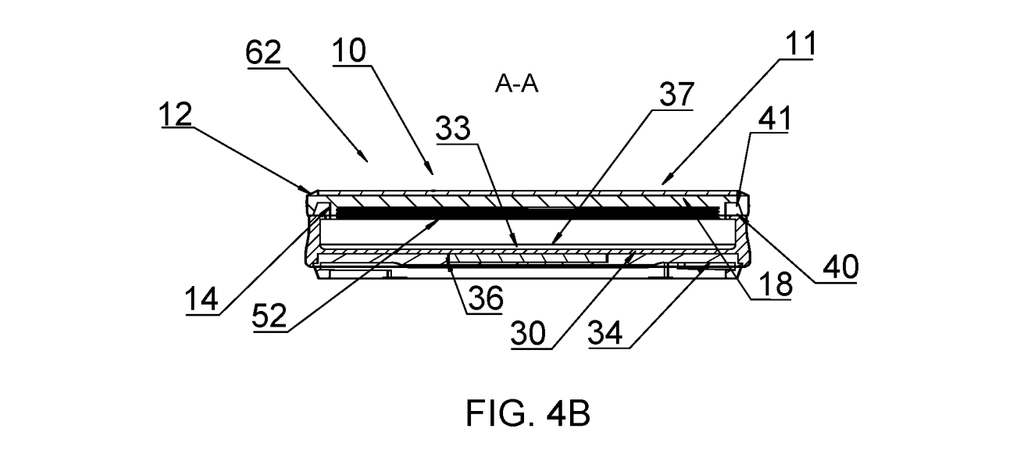
FIG. 4B is a sectional side view of a lens cap of FIG. 4A.
Figure 5A:
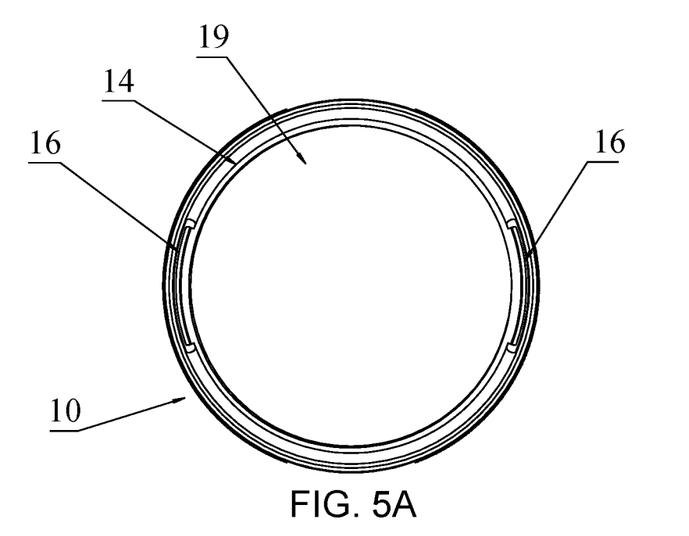
FIG. 5A is an isolated view of the inner planar surface of a plate
Figure 5B:
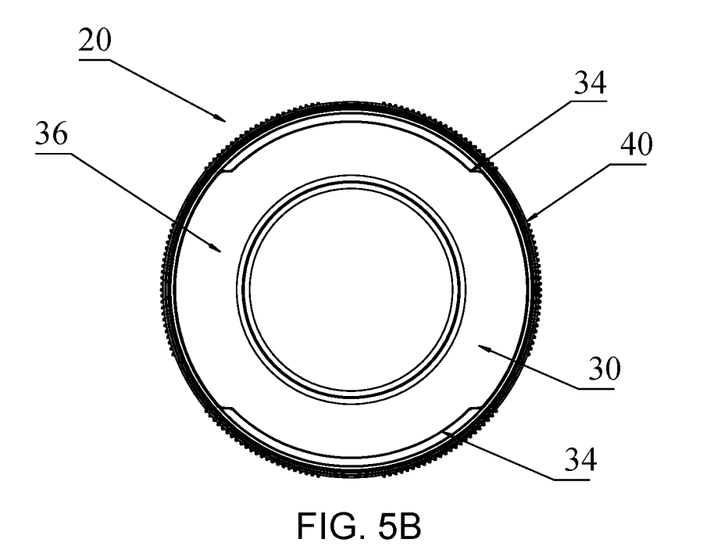
FIG. 5B is a front view of a case.
Figure 6A:
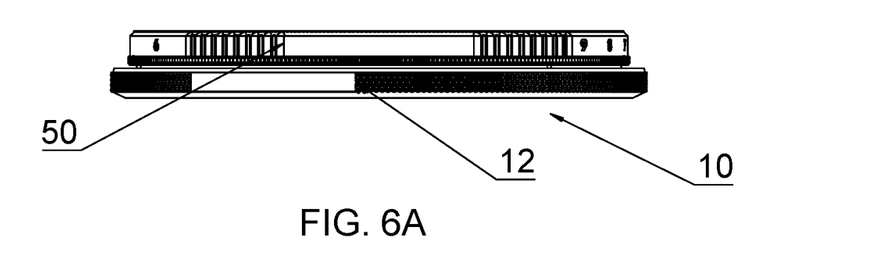
FIG. 6A is an isolated left side view of a plate coupled with a camera filter.
Figure 6B:
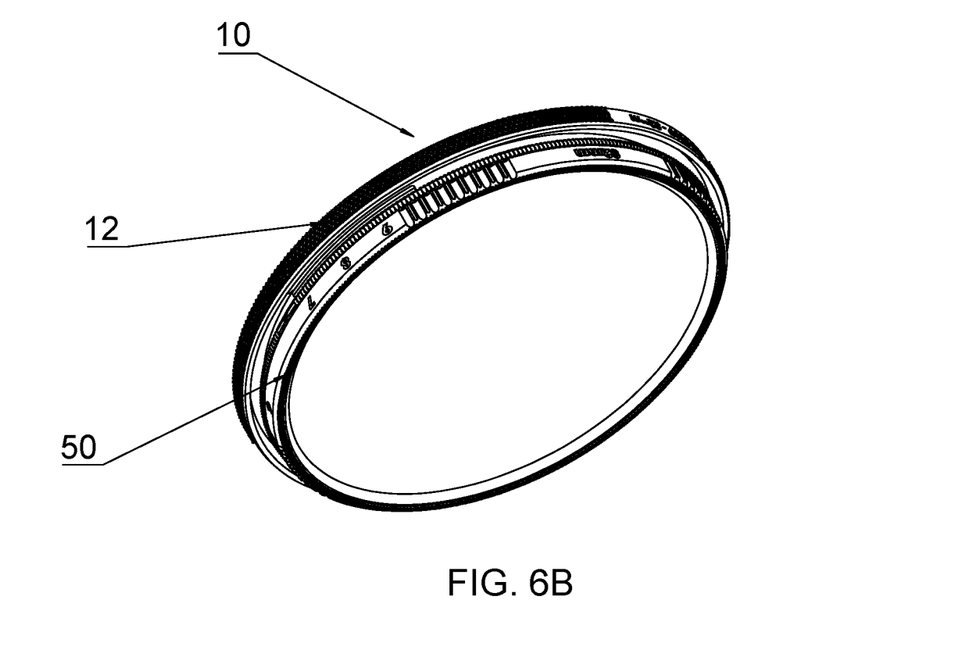
FIG. 6B is an isolated perspective view of a plate coupled with a camera filter.
Figure 7A:
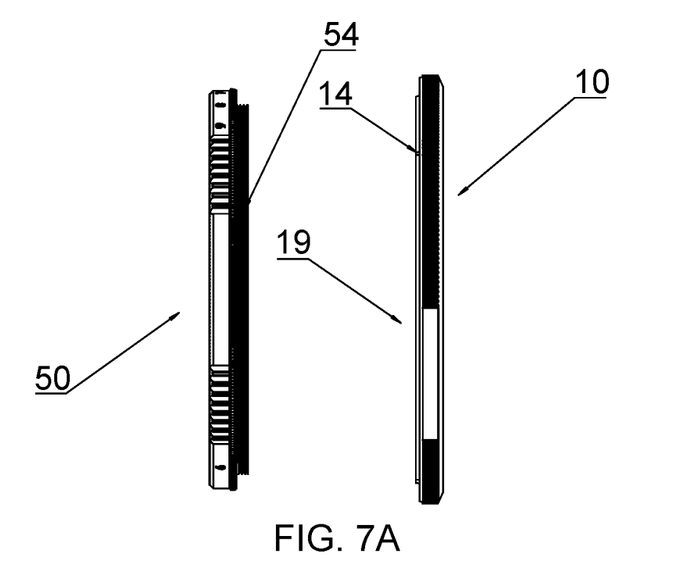
FIG. 7A is a left side view of an isolated plate and camera filter uncoupled.
Figure 7B:
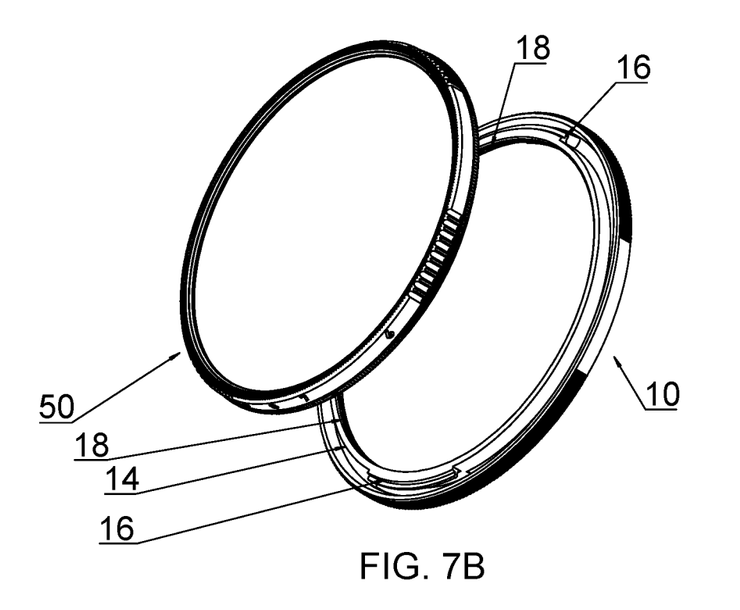
FIG. 7B is a perspective view of an isolated lens cap and camera filter uncoupled.

Substrate flanges 32 may extend radially from the perimeter of the base 30 (see FIG. 3A). The substrate flanges 32 may enhance the injection mold strength between the base 30 and sidewall 40. The inner planar surface 37 of the base 30 may be coated with a dampening layer 33 of thermoplastic polyurethane or other thermoplastic elastomer (see FIG. 4B). The dampening layer 33 may enhance the structural integrity of the case 20, improve the overmold bonding strength and decrease the risk of damage to a housed optical element.

The plate 10 may be a modular component with planar surfaces of similar circumference or radius as the base (36, 37). The exemplary plate 10 is comprised of a plate top 11 and a plate coupling component 12. Alternative plates may be comprised of a single component. The plate top 11 may form the outer planar surface of the plate 10 and couple with the plate coupling component 12 by adhesion, riveting, or other fastening method. Base coupling means and filter coupling means may be located on inner planar surface of the plate 10. In an exemplary embodiment, a ring 14 extends from an inner planar surface of the plate 19. The outer annular surface of the ring 14 comprises male bayonet 16 components, an exemplary base coupling means. The inner annular surface of the ring 14 comprises plate threading 18, an exemplary filter coupling means. The male bayonet 16 components extend outward from the center of the planar surfaces and are configured to fit between the female bayonet 34 components. The male and female bayonet components are corresponding and complementary bayonet components. Alternative embodiments may utilize male components on the base and female components on the plate.

The plate 10 may be comprised of aluminum, brass, glass filled nylon, thermoplastic polyester, thermoplastic polymer, or other rigid material. Aluminum comprises the exemplary plate top 11 and plate coupling component 12.

Figure 1A:
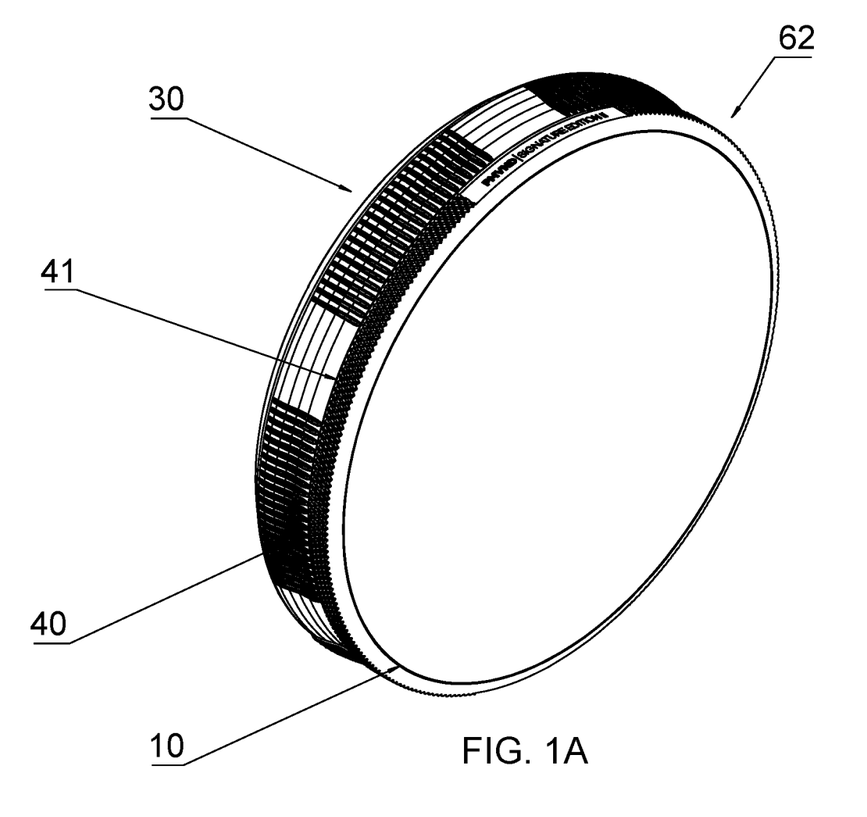
FIG. 1A is a back perspective view of a lens cap in a storage position.
Figure 1B:
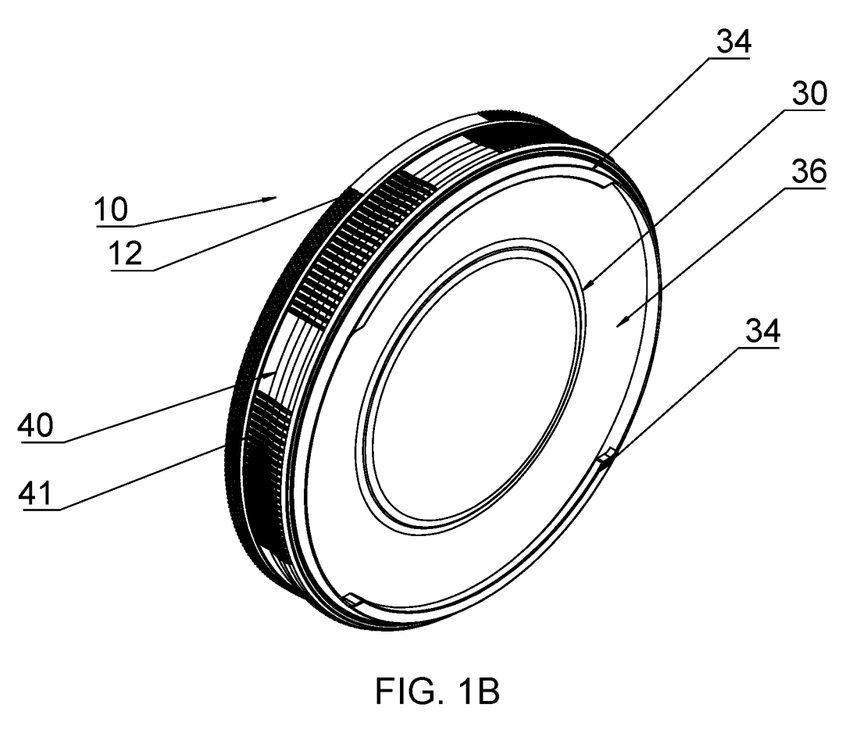
FIG. 1B is a front perspective view of a lens cap in a storage position.
Figure 2A:
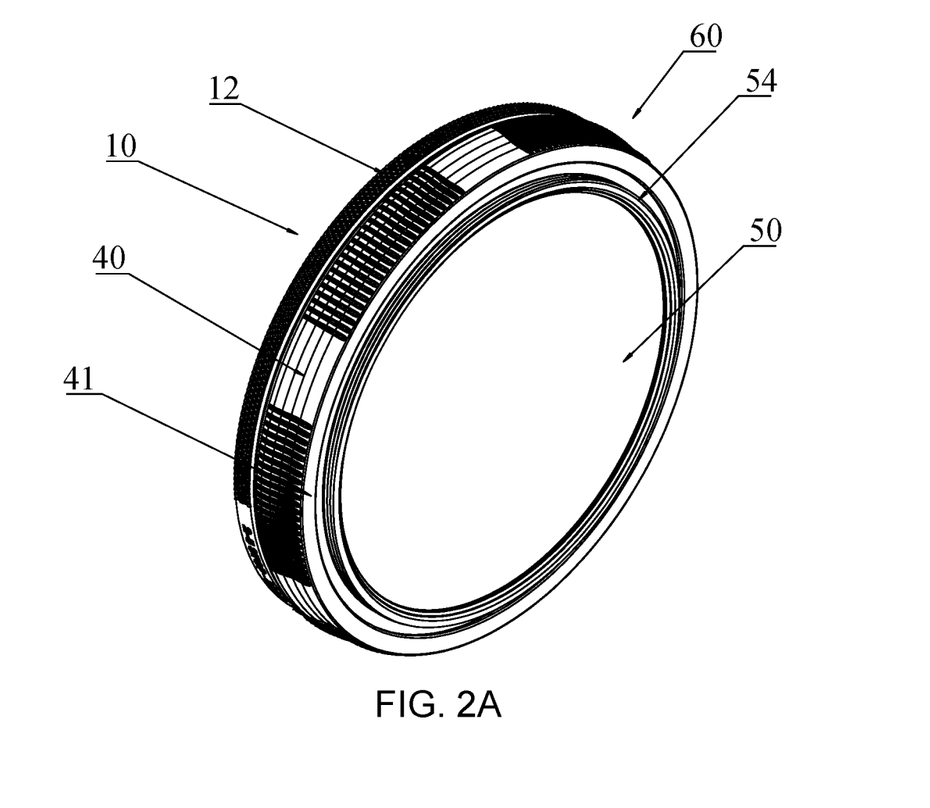
FIG. 2A is a back perspective view of a lens cap in an access position, and a housed camera filter
Figure 2B:
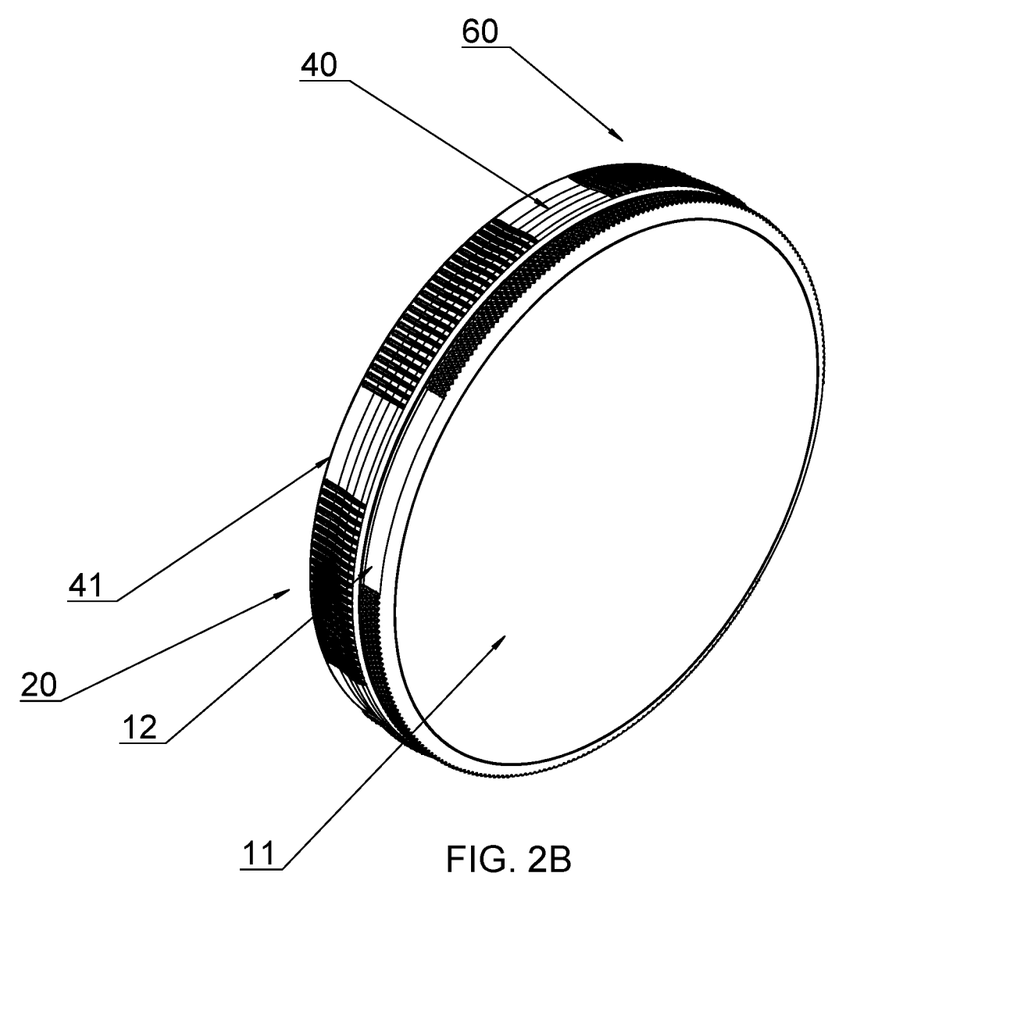
FIG. 2B is a front perspective view of a lens cap in an access position.

An access position 60 is created when the plate 10 couples with the case 20. The exemplary plate 10 couples with the base 30 by inserting the male bayonet 16 aspects into the female bayonet 34. The cap 10 is rotated until the female aspects 34 cover the male bayonet 16, thereby coupling the two components (10, 20). The base 30 outer planar surface 36 may be recessed from the female bayonet 34 to enhance storage of a coupled plate 10. An optical element may be inserted into or extracted from the cavity 52 (see FIG. 2A).

In an access position 60 an installed optical element stored in a case 20 may couple with a camera or other object. The filter's coupling component, filter threading 54 in the exemplary camera filter 50, remains exposed. The filter threading 54 may couple with a coupling component of a camera, thereby mounting the lens cap-case 8. The case 20 and plate 10 protect the mounted filter 50 in such an orientation. The case 20 and plate 10 may be removed from the filter, enabling image capture. The sidewall 40 is constructed of material with elasticity enabling both manual insertion and removal of an optical element, and retention of the optical element against inadvertent dislodgement when it is inserted into the case in either an access position 60 or storage position 62. Also, the cavity 52 dimensions may be configured to contact a housed optical element, creating a friction fit to prevent such dislodgement.

A storage position 62 is created by coupling the plate 10 with a camera filter 50 or other optical element housed in the case 20. As is common in the art, the exemplary camera filter 50 comprises annular threading 54. The filter 50 is inserted into the case 20 so the threading 54 is oriented away from the base 30, aligning roughly with the sidewall back perimeter 40. The plate threading 18 couples the filter threading 54. The sidewall 40 is configured so the plate 10 perimeter abuts the sidewall back perimeter 41 when coupled with the filter 50, thereby enclosing the filter 50. The cavity 52 dimensions may be configured to contact a housed optical element, to prevent such dislodgement.

Flexibility of the sidewall 40 may create tolerancing that enables insertion and removal of a filter 50 into the case 20 when coupled with the plate 10. Coupling an optical element outside the case 20 prior to insertion into the cavity 52 may be easier and provides protection of one side of the optical element (see FIGS. 6A-7B).

Sidewall 40 and plate 10 dimensions may be configured so the outer edge of the plate 10 aligns or roughly aligns with the sidewall back perimeter 41 in a storage position 62.

The filter coupling means may be adapted to couple different optical elements. A plate may comprise snaps, pressure fitting, magnetic, and other coupling methods adapted to couple the optical element or range of optical elements a case is configured to store.

The foregoing disclosure is for illustration and description. Alternative embodiments may be possible in light of the above teachings. The embodiments described where chosen to explain the principles of the invention and its practical application to enable others skilled in the art to best utilize the invention. It is intended that any claims thereafter be construed to include other alternative embodiments of the invention except as limited by the prior art.

I claim:

1. A camera lens cap, comprising:
   a. a case comprising a base and a sidewall;
   b. the base comprising plate coupling means;
   c. a plate comprising base coupling means and filter coupling means;
   d. the base coupling means configured to couple with plate coupling means;
      whereby an access position is created;
   e. said base and sidewall creating a cavity, the cavity being configured to house an optical element;
   f. the filter coupling means being configured to couple with an optical element housed in the cavity, whereby a storage position is created.

2. A camera lens cap, comprising:
   a. a plate, the plate comprising an annular ring;
   b. the annular ring comprising base coupling means and filter coupling means;
   c. a case comprising a circular and planar base, and a sidewall extending from a perimeter of the base;
   d. the case comprising plate coupling means on an outer planar surface of the base;
   e. the base coupling means being capable of removably coupling with the plate coupling means, whereby creating an access position;
   f. the case is configured to house a camera filter;
   g. the filter coupling means being capable of removable coupling with a camera filter housed in the case, whereby a storage position is created.

3. The camera lens cap in claim 2, wherein the sidewall is comprised of elastic material enabling removal of a housed camera filter while the plate is coupled in the storage position.

4. The camera lens cap in claim 2, wherein the base coupling means comprise one aspect of a bayonet coupling system, and the plate coupling means comprise a corresponding aspect of a bayonet coupling system.

5. The camera lens cap in claim 2, wherein the base and sidewall are conjoined by overmolding.

* * * * *